No. 798,297. PATENTED AUG. 29, 1905.
W. C. RARIG.
FENDER ROD FOR MOWERS.
APPLICATION FILED MAR. 16, 1905.

Witnesses:
H. S. Gaither
C. A. Mullen

Inventor:
Wilden C. Rarig
By Lamberlin Wilkinson
Attys

UNITED STATES PATENT OFFICE.

WELDEN C. RARIG, OF OGDEN, UTAH.

FENDER-ROD FOR MOWERS.

No. 798,297. Specification of Letters Patent. Patented Aug. 29, 1905.

Application filed March 16, 1905. Serial No. 250,352.

*To all whom it may concern:*

Be it known that I, WELDEN C. RARIG, a citizen of the United States, residing at Ogden, county of Weber, State of Utah, have invented a certain new and useful Improvement in Fender-Rods for Mowers; and I declare the following to be a full, clear, and exact description of the invention, such as will enable others skilled in the art to which it pertains to make and use the same, reference being had to the accompanying drawings, which form a part of this specification.

My invention relates in general to mowers, and more particularly to fender-rods for the inner shoes of mower cutter-bars.

In the use of mowers for cutting heavy grass, such as clover and alfalfa, the grass lodges on the fender-rods, as constructed prior to my invention, and accumulates on the fender-rod, inner shoe, yoke, and inner end of the cutter-bar to such an extent as to press down the standing or uncut grass in front of the cutter-bar, thereby preventing the mower from cutting the grass. It is therefore necessary to frequently stop and back the machine in order to remove the obstructing grass from the fender-rod and adjacent parts of the mower, which occasions loss of time and is dangerous to the operator.

The primary object of my invention is to provide a fender-rod for the inner shoe of a mower cutter-bar which will press down both the cut and uncut grass no matter how high it may be, so that the inner shoe of the cutter-bar and yoke will pass over the grass without choking or clogging and which will be free from sharp bends, points, or angular portions to catch and accumulate the grass.

A further object of my invention is to provide a fender-rod for the cutter-bars of mowers which will be simple in construction, inexpensive in manufacture, and efficient in use.

The embodiment of my invention herein disclosed may be generally described as consisting in a curved rod flexibly secured to and extending forwardly from the front end of the inner shoe of a mower cutter-bar to the tongue or other part of the machine to which it is attached at a point preferably in advance of the doubletree-iron, and a second curved rod secured to the first rod at a point approximately one-third of its length from the point of the inner shoe and extending rearwardly above and over the cutter-bar at a point a short distance away from the yoke.

My invention will be more fully described hereinafter with reference to the accompanying drawings, in which the same is illustrated as embodied in a convenient and practical form, and in which—

Figure 1:
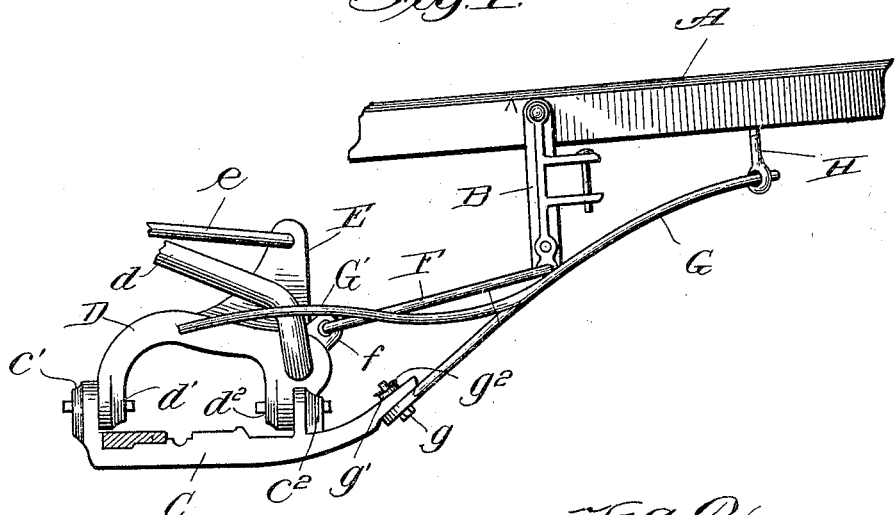
Figure 2:
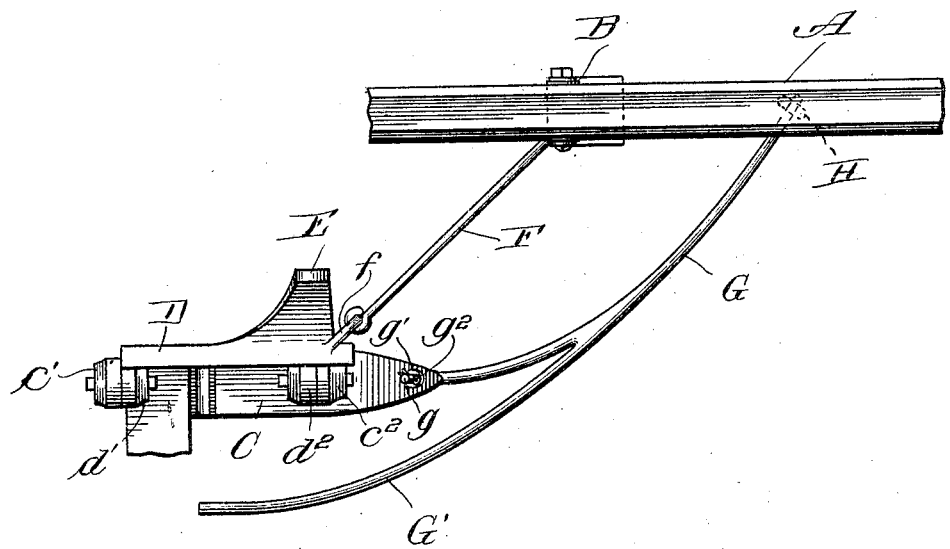

Figure 1 is an elevational view, and Fig. 2 a plan view.

The same reference characters are used to designate the same parts in the two figures of the drawings.

Reference character A indicates a portion of the tongue of a mower to which is secured the usual doubletree-iron B.

C indicates the inner shoe of the mower cutter-bar which is provided with the usual yoke D. Any suitable connection is provided between the ends of the yoke and the inner shoe C—such, for instance, as ears $d'$ and $c'$—through which a bolt passes and similar ears $d^2$ and $c^2$ also connected by a bolt.

E indicates a bracket projecting from the yoke to which is attached the tilting connecting-rod $e$.

$d$ indicates a portion of the usual push-bar extending from the yoke at a point above the ear $d^2$.

F indicates the draft-rod, which extends from an ear $f$, projecting from the yoke D and is connected at its opposite end to the doubletree-bracket B.

The construction above described is that of any usual type of mower, and is merely illustrated in order that the connection therewith and operation of my improvement may be fully understood.

G indicates my improved fender-rod which is pivotally secured at its lower end to the front end of the inner shoe C of the cutter-bar. Any suitable means may be provided for connecting the rod G and shoe C—such, for instance, as a bolt $g$, the upper end of which projects through a bur $g'$ and is provided with a spring cotter-pin $g^2$. The fender-rod G is curved so as to extend upwardly and toward the tongue A or other suitable part of the machine. Any suitable means may be provided for attaching the end of the rod G to the tongue—such, for instance, as a screw-eye H, secured to and extending beneath the tongue through which the rod extends. In practice I have found that good results may be obtained by connecting the rod to the tongue at a point eight to twenty inches in front of the doubletree-iron. A second rod G' extends rearwardly from the first rod G, preferably from a point approximately one-third of the length of the rod G from the end of the shoe C. The second rod G' extends above the cutter-bar and is spaced a short distance from the yoke D. While the end of the rod G' may terminate at any desired distance above the cutter-bar and away from the yoke, yet I have found in practice that good results may be obtained by terminating such rod about six to eight inches above the cutter-bar and about the same distance from the yoke.

In the use of my improved fender-rod the cut and uncut grass is engaged thereby and pressed downwardly so that the shoe and cutter-bar will pass over the same without danger of choking the machine. The shape of my improved fender-rod is such that no points or angular portions exist which would serve to catch the grass and collect the same upon the cutter-bar or its inner shoe or yoke.

The bolt g extends loosely through the lower end of the fender-rod and point of the inner shoe, so as to afford a pivotal connection in order that the cutter-bar may be swung into an upright position when the machine is not in cutting operation—as, for instance, when it is traveling from one point to another. The bur and spring cotter-pin on the end of the bolt afford a sufficiently flexible connection to readily permit of the relative movement between the fender-rod and inner shoe incident to the swinging of the cutter-bar into a vertical position. The front end of the fender-rod is supported in sliding engagement with the tongue or other suitable part of the machine, so that the rod may be permitted to reciprocate through its supporting means—such, for instance, as the eye H—as the cutter-bar is swung upwardly or downwardly in adjusting its height.

From the foregoing description it will be observed that I have invented an improved fender-rod for the inner shoes of mower cutter-bars which, though extremely simple in construction, is efficient in use, entirely obviating the objection existing to fender-rods as heretofore constructed, inasmuch as the grass will not be caught and accumulated thereby. It is also obvious that my improvement may be readily attached to mowers of any usual construction and that, owing to the flexible connection of the fender-rod with the point of the inner shoe and the sliding connection between the opposite end of the rod and the tongue or other suitable part of the machine, the cutter-bar may be swung into an upright position when the machine is not in the operation of cutting and also adjusted in height when in use.

While I have described more or less in detail the embodiment in which I have illustrated and described my invention, yet I do not wish to be understood as limiting myself thereto, the essential features of my invention being the absence of any bends, points, or angular portions in the fender-rod which would catch and accumulate the grass and the supporting of the fender-rod at both ends without interfering with the upward or downward movement of the cutter-bar when it is swung into or out of position for use or adjusted in height to regulate its position relatively to the ground.

Having now fully described my invention, what I claim as new, and desire to secure by Letters Patent, is—

1. The combination with the inner shoe of a mower cutter-bar, of a fender-rod extending from the front end of said shoe to a part of the mower, means for pivotally securing one end of said rod to said shoe, means for attaching the opposite end of said rod to the mower, and a second rod extending rearwardly from said first rod and terminating above the mower cutter-bar.

2. The combination with the inner shoe of a mower cutter-bar, of a fender-rod extending from the front end of said shoe to a part of the mower, means for pivotally securing one end of said rod to said shoe, and means for supporting the opposite end of said rod in sliding engagement with said part of the mower.

3. The combination with the inner shoe of a mower cutter-bar, of a fender-rod extending from the front end of said shoe to the tongue of the mower, means for securing one end of said rod to said shoe, and an eye secured to the tongue of the machine through which the opposite end of said rod extends.

4. The combination with the inner shoe of a mower cutter-bar, of a fender-rod extending from the front end of said shoe to the tongue of the mower, means for pivotally securing one end of said rod to said shoe, means for attaching the opposite end of said rod to the tongue of the mower, and a second rod extending rearwardly from said first rod and terminating above the mower cutter-bar.

5. The combination with the inner shoe of a mower cutter-bar, of a fender-rod extending from the front end of said shoe to the tongue of the mower, means for flexibly securing one end of said rod to said shoe, means for supporting the opposite end of said rod in sliding engagement with the tongue of the mower, a second rod extending rearwardly from said first rod and terminating above the mower cutter-bar.

6. The combination with a mower, of a fender-rod for the inner shoe of the mower cutter-bar, means for flexibly supporting one end of said rod, and means for supporting the other end of said rod in sliding engagement with a part of the mower.

7. The combination with a mower, of a fender-rod for the inner shoe of the mower cutter-bar, means for flexibly supporting one end of said rod, means for supporting the other end of said rod in sliding engagement with a part of the mower, and a second rod extending rearwardly from said first rod at a point intermediate of its ends.

In testimony whereof I sign this specification in the presence of two witnesses.

WELDEN C. RARIG.

Witnesses:
A. L. BREMEN,
W. F. RUDIGER.